(12) United States Patent
Rapoza

(10) Patent No.: US 9,889,481 B1
(45) Date of Patent: Feb. 13, 2018

(54) METAL PART EXTRUSION CONTROL

(71) Applicant: Boothroyd Dewhurst, Inc., Wakefield, RI (US)

(72) Inventor: Brian Rapoza, Richmond, RI (US)

(73) Assignee: Boothroyd Dewhurst, Inc., Wakefield, RI (US)

( * ) Notice: Subject to any disclaimer, the term of this patent is extended or adjusted under 35 U.S.C. 154(b) by 251 days.

(21) Appl. No.: 14/545,838

(22) Filed: Jun. 26, 2015

(51) Int. Cl.
*B21C 31/00* (2006.01)
*G05B 15/02* (2006.01)
*B21C 23/01* (2006.01)
*B21C 29/00* (2006.01)

(52) U.S. Cl.
CPC ............... *B21C 31/00* (2013.01); *B21C 23/01* (2013.01); *B21C 29/003* (2013.01); *G05B 15/02* (2013.01)

(58) Field of Classification Search
CPC ....... B21C 23/00; B21C 23/001; B21C 23/01; B21C 23/04; B21C 23/08; B21C 29/003; B21C 31/00; G05B 15/02; B29C 47/92; B29C 2947/92; B29C 2947/92019; B29C 2947/92028; B29C 2947/92047; B29C 2947/92025; B29C 2947/92104; B29C 2947/92209; B29C 2947/92504; B29C 2947/92514; B29C 2947/92523; B29C 2947/925; B29C 2947/42; B29C 2947/9258; B29C 2947/926; B29C 2947/92704; B29C 2947/92542; B22F 3/20
USPC ................. 72/14.8–19.9, 13.13, 23.1, 253.1; 148/689
See application file for complete search history.

(56) References Cited

U.S. PATENT DOCUMENTS

| | | | | | |
|---|---|---|---|---|---|
| 5,435,161 | A | * | 7/1995 | King | B21C 31/00 72/16.5 |
| 5,614,137 | A | * | 3/1997 | Pandit | B21C 31/00 264/40.6 |
| 6,153,131 | A | * | 11/2000 | Huang | B21C 25/00 264/176.1 |

OTHER PUBLICATIONS

Laue, K. et al., "Extrusion: Processes, Machinery, Tooling", American Society for Metals, 1981, 457 pgs.
Semiatin, S.L. et al., "ASM Handbook vol. 14A, Metalworking: Bulk Forming", ASM International, 2005, 860 pgs.
Saha, Pradip K., "Aluminum Extrusion Technology", ASM International, 2000, 10 pgs.

(Continued)

*Primary Examiner* — Peter DungBa Vo
*Assistant Examiner* — Joshua D Anderson
(74) *Attorney, Agent, or Firm* — Finch & Maloney PLLC

(57) ABSTRACT

A technique for optimizing metal extrusion process parameters includes receiving values representing properties of an extrusion press machine, and calculating an estimated surface exit temperature of a metal work product resulting from an extrusion of a metal billet using the extrusion press machine based on the machine property values, an initial temperature of the metal billet prior to the extrusion, an extrusion force applied to the metal billet during the extrusion, and an extrusion speed of the metal work product. The estimated surface exit temperature of the metal work product is compared with a target hot shortness exit temperature of the metal work product. The initial temperature of the metal billet, the extrusion speed, and the extrusion force are changed based on the comparison until the estimated surface exit temperature equals the target hot shortness exit temperature.

21 Claims, 6 Drawing Sheets

(56) References Cited

OTHER PUBLICATIONS

"Heat Capacity: Aluminum", http://www.efunda.com/materials/elements/HC_Table.cfm?Element_ID=AI, efunda-engineering fundamentals, 2015, 1 page.

"Thermal Conductivity: Aluminum", http://www.efunda.com/materials/elements/TC_Table.cfm?Element_ID=Al, efunda-engineering fundamentals, 2015, 2 pages.

Qamar, S.Z. et al., "A New Definition of Shape Complexity for Metal Extrusion", Journal of Materials Processing Technology, 2004, pp. 1734-1739.

Qamar, S.Z., "Modeling and Analysis of Extrusion Pressure and Die Life for Complex Aluminum Profiles", PhD Dissertation, King Fahd University of Petroleum & Minerals, Jun. 2004, 3 pages.

Akeret, R. et al., "Atlas of Hot Working Properties of Nonferrous Metals", Deutsche Gesellschaft für Metallkunde (DGM), 1978, 764 pgs., Germany.

Nieto, Jose Torre, "Feature Based Costing of Extruded Parts", Thesis, University of Illinois, 2010, 151 pgs.

* cited by examiner

US 9,889,481 B1

METAL PART EXTRUSION CONTROL

REFERENCE TO COMPUTER PROGRAM LISTING APPENDIX

A computer program listing appendix incorporating features of the present disclosure is submitted herewith on a single compact disc in compliance with 37 C.F.R. § 1.52(e), the contents of which are incorporated herein by reference. The compact disc is submitted in duplicate. The filename, date and size for the file submitted on each compact disc is:
  pseudocode.txt, Jun. 22, 2015, 33,922 bytes

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE DISCLOSURE

The present disclosure relates generally to metal extrusion processes, and more particularly, to techniques for optimizing metal extrusion process parameters.

BACKGROUND

Extrusion is a process used to create objects of a fixed cross-sectional profile. A material is pushed or pulled through a die to form the desired cross-section. Extrusion may be continuous (indefinite length) or semi-continuous (producing many pieces). The temperature and malleability of the material affects the rate at which the extrusion process occurs, which itself generates heat from work and friction, as well as the type of machinery used to perform the extrusion. Extrusion can be used to create complex cross-sections and to work materials that are brittle, because the material only encounters compressive and shear stresses. Metal is a commonly extruded material.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Techniques for optimizing metal extrusion process parameters are provided. One methodology, in accordance with an embodiment of the present disclosure, includes receiving values representing properties of an extrusion press machine, and calculating an estimated surface exit temperature of a metal work product resulting from an extrusion of a metal billet using the extrusion press machine. In at least one embodiment, some of the factors included in the calculation are based on the machine property values, an initial temperature of the metal billet prior to the extrusion, an extrusion force applied to the metal billet during the extrusion, and an extrusion speed of the metal work product. The estimated surface exit temperature of the metal work product is compared with a target hot shortness exit temperature of the metal work product. The initial temperature of the metal billet, the extrusion speed, and the extrusion force are changed based on the comparison until the estimated surface exit temperature equals the target hot shortness exit temperature. This methodology can be performed for a number of different extrusion press machines, initial billet temperatures, extrusion forces and speeds, and billet lengths to find an optimal combination of such parameters.

Figure 1:
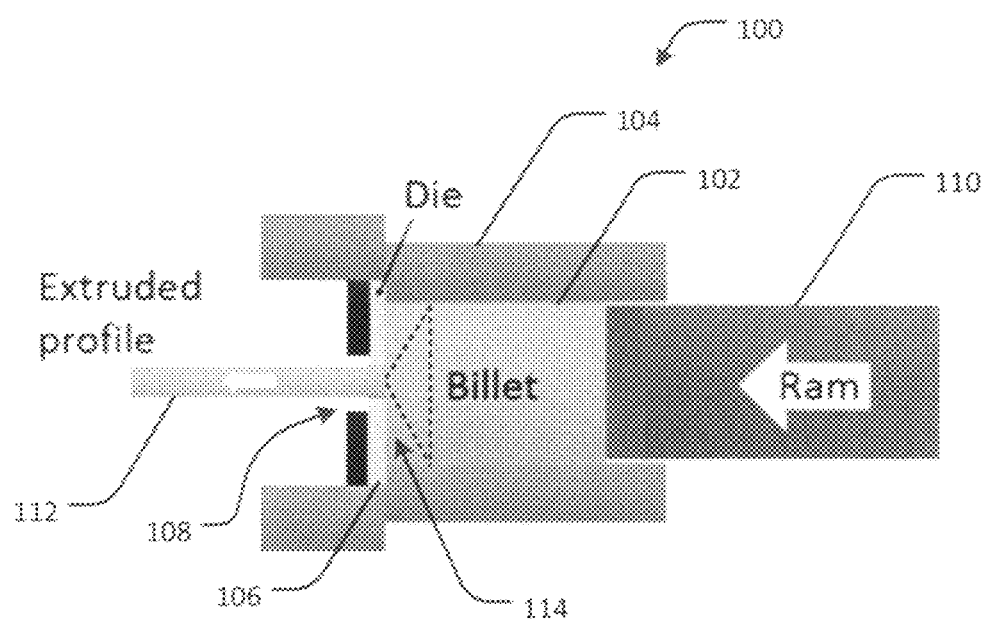
FIG. 1 is a schematic representation of an example metal extrusion apparatus.

FIG. 1 is a schematic representation of an example metal extrusion apparatus 100. In metal extrusion, a billet of material 102 is heated and then placed into a billet container 104 on an extrusion press. A die 106 with a shaped hole 108 is located at one end of the billet container 104. A hydraulically powered press ram 110 applies a force to the billet 102, such as shown in FIG. 1. The force applied to the billet 102 by the press ram 110 causes the billet 102 to expand against the inner wall of the billet container 104. At the die 106, some of the billet material is forced through the shaped hole 108 in the die 106 to form an extruded profile 112. Some of the billet material 102 near the die does not move through the die 106, and instead forms a funnel-shaped dead zone of material 114 that cannot be extruded. Extrusion may continue until the press ram 110 gets close to the dead zone of material 114 near the die 106. However, as the press ram 110 approaches the dead zone of material 114, the press force required for extrusion rapidly increases. At this point, extrusion is stopped and the press ram 110 and billet container 104 are withdrawn. The dead zone of material 114 on the end of the billet 102 is then cut, using a cutting or shearing device, from the partially extruded profile that remains in the extrusion die 106 and recycled as butt scrap. Another billet is then loaded onto the press and the extrusion process is repeated with the second billet automatically welded to the partially extruded profile that remains in the extrusion die from the first billet using a weld chamber that is part of the extrusion die. This automatic welding of material within the die makes this type of billet on billet extrusion process a somewhat continuous process with no interruptions in the extruded profile.

There are several different parameters associated with the metal extrusion process. Some of these parameters are controllable. For example, after a part profile is decided upon and an extrusion press is chosen, the controllable process parameters may include the extrusion force and the related extrusion ram speed, the temperature of the billet, and the length of the billet. Each parameter has an effect on the overall cost of the parts produced. Since metal extrusion process parameters can affect the cost of an extruded part, the total part cost can be minimized by optimizing each parameter. For example, the total cost to manufacture a part may include the cost of the material used to make the part, the cost of the processing for making the part, the cost of setting up the machinery to make the part, and the cost of any dedicated tooling for making the part. However, the minimum total cost is not always achieved by minimizing individually each of these costs because often there are relationships inherent in a manufacturing process that cause one process parameter to affect more than one cost. In these cases, adjusting certain extrusion process parameters minimizes the overall total cost of the part.

For instance, prior to loading the billet into the extrusion press, a source of heat is applied to the billet (e.g., using a billet heating furnace) to raise the temperature of the billet significantly above what is considered the recrystallization temperature of the extruded alloy. The recrystallization temperature of the alloy is the temperature where the alloy will recrystallize during deformation and not be subject to strain hardening. The recrystallization temperature is generally considered the lower limit of the hot working temperature range for the alloy. During extrusion, the exit temperature of the extruded profile becomes higher than the temperature of the billet. This increase in temperature is due to the conversion of work done by the extrusion press into heat. There are at least three sources of heat added to the extruded material during extrusion. One source of heat results from the substantial friction that exists between the outer surface of the billet and the inner wall of the billet container as the surface of the billet slides along the wall of the billet container. Another source of heat results from the work done during deformation of the extruded material as it is strained adiabatically prior to passing through the extrusion die. Yet another source of heat results from the friction that exists between the die and the extruded profile as the surface of the profile slides along the die land. Note that as the speed of the extrusion process increases, the rate of heating due to these sources of heat also increases, which causes a larger rise in the exit temperature on the surface of the extruded profile. In most cases, the surface exit temperature defines the upper limit of the speed of the extrusion process. The upper limit of the exit temperature depends on the type of alloy used in the extrusion process.

When the extrusion process is carried out too rapidly and the temperature on the surface of the extruded profile becomes too high for the extruded alloy, some localized melting on the surface of the extruded profile can occur. This localized surface melting is called hot shortness. Extruding the alloy such that the exit temperature on the surface of the extruded profile is at or above this hot shortness temperature can cause the surface of the extruded profile to become cracked or torn. This surface tearing usually begins in the areas of the extruded profile that have thin walls or sharp corners, and is an undesirable effect that represents defects in the parts.

In some cases, the process parameters associated with the extrusion process are adjusted such that the speed of extrusion results in an exit temperature that is slightly below this hot shortness temperature limit. This results in production of the highest quality parts at the lowest possible process cost. However, there are many different combinations of process parameters that result in extrusion at the hot shortness temperature limit. For example, a higher billet temperature can reduce the flow stress of the extruded material along with a lower extrusion force. Alternatively, a lower billet temperature can increase the extruded alloy's flow stress along with a higher extrusion force. Both of these conditions can result in similar exit temperatures on the surface of the extruded profile, provided that the extrusion press supplies a suitable force. For example, a higher extrusion force and a lower billet temperature may result in the highest exit speed and the lowest process cost for the given exit temperature.

The billet length is another process parameter that affects the total cost of an extruded part. For example, when the billet length is small, the temperature increase during extrusion due to billet-to-container surface friction is also low. A reduced billet length can result in less heat added during the extrusion process and a correspondingly higher exit speed and lower process cost for the extruded profile at a given exit temperature. However, when the length of the billet is small, a larger number of billets and, consequently, a larger number of billet loading and dead zone trimming operations are needed for a given part. This may cause an increase in the nonproductive time spent on the extrusion press, which results in an increase in the process cost due to the decrease in machine utilization. Furthermore, increasing the number of billets used to produce parts affects the amount of material used to produce the parts. For instance, the number of material dead zones that are trimmed and recovered as butt scrap material at the end of extrusion for each billet increases as the billet length decreases, which increases the material costs even as the process costs decrease. On the other hand, use of a longer billet results in additional heat added to the extrusion process, a corresponding decrease in exit speed of the extruded profile, a reduction in machine nonproductive time, and an increase in material utilization due to a reduction in billet butt scrap. As such, determination of an optimal billet length will balance these costs and result in the minimum total cost per part.

To this end, techniques for optimizing metal extrusion process parameters are provided. One methodology, in accordance with an embodiment of the present disclosure, includes selecting an extrusion press from a database of available extrusion presses, which includes various machine properties for each press. The extrusion ratio of the extruded profile is calculated based on the selected extrusion press. If the extrusion ratio is between the maximum and minimum permissible extrusion ratios for the extruded alloy, the diameter of the extruded profile's circumscribing circle is compared to the billet diameter of the extrusion press. If the circumscribing circle diameter is also less than 85 percent of the extrusion press's billet diameter, extrusion on that extrusion press is possible. The billet length is set to the minimum value permissible on the extrusion press, and the temperature of the billet is set to the minimum billet temperature for the extruded alloy. Extrusion is simulated to occur at the maximum ram speed possible on the selected extrusion press. The extrusion force at the maximum ram speed is estimated, but if the press cannot supply the force needed to extrude the profile at maximum ram speed, the ram speed is reduced such the extrusion press uses all of its available force for extrusion. The surface exit temperature for the extruded profile is estimated based on the physics of the extrusion process. The estimate of the exit temperature is compared against the hot shortness target exit temperature. If the exit temperature on the surface of the extruded profile is lower than the hot shortness target exit temperature, the billet temperature is increased to reduce the extruded alloy's flow stress and increase the exit speed of the extruded profile while still ensuring the maximum press ram speed is not exceeded. The billet temperature is increased until the exit temperature on the surface of the extruded profile is equal to the hot shortness target exit temperature.

If, on the other hand, the surface exit temperature for the extruded profile is higher than the target temperature for hot shortness, the initial assumption that extrusion is carried out at the maximum press ram speed or maximum force possible on the extrusion press is incorrect. If the billet temperature is at its minimum value for the extruded alloy, the billet temperature cannot be reduced further. Thus, instead of reducing the billet temperature, the extrusion force is decreased, which slows down the ram press speed, until the surface exit temperature for the extruded profile is equal to the hot shortness target exit temperature.

After this process is completed, the optimal billet temperature, the optimal extrusion press force and the optimal exit speed of the extruded profile are known for the smallest billet length possible on the extrusion press. Based on these optimal process parameters, the minimum total cost per part is calculated at that minimum billet length. The billet length is then increased by a small amount and the entire process repeated to estimate the optimal billet temperature, the optimal extrusion press force, and the optimal exit speed of the extruded profile at the new billet length. The total cost per part is calculated based on these optimal process parameters to yield the minimum total cost per part at that billet length. The billet length is changed to values between the minimum and maximum billet length limits for the selected extrusion press and the optimization process repeated to determine the optimal process parameters for each billet length. The minimum total cost per part is calculated for each billet length based on these optimal process parameters and then plotted out as a function of billet length. The optimal billet length is then identified as the billet length that results in the lowest minimum total cost per part with the optimal process parameters being the billet temperature, press force, and exit speed that correspond to that optimal billet length.

This optimization process is then repeated for each extrusion press available in the database of extrusion presses. The extrusion press that results in the overall lowest total cost per part is identified as the optimal extrusion press to extrude the part, and the optimal process parameters to yield the lowest minimum total cost for the part are those that correspond to the optimal billet length on that extrusion press.

Example Methodology

Figure 2:
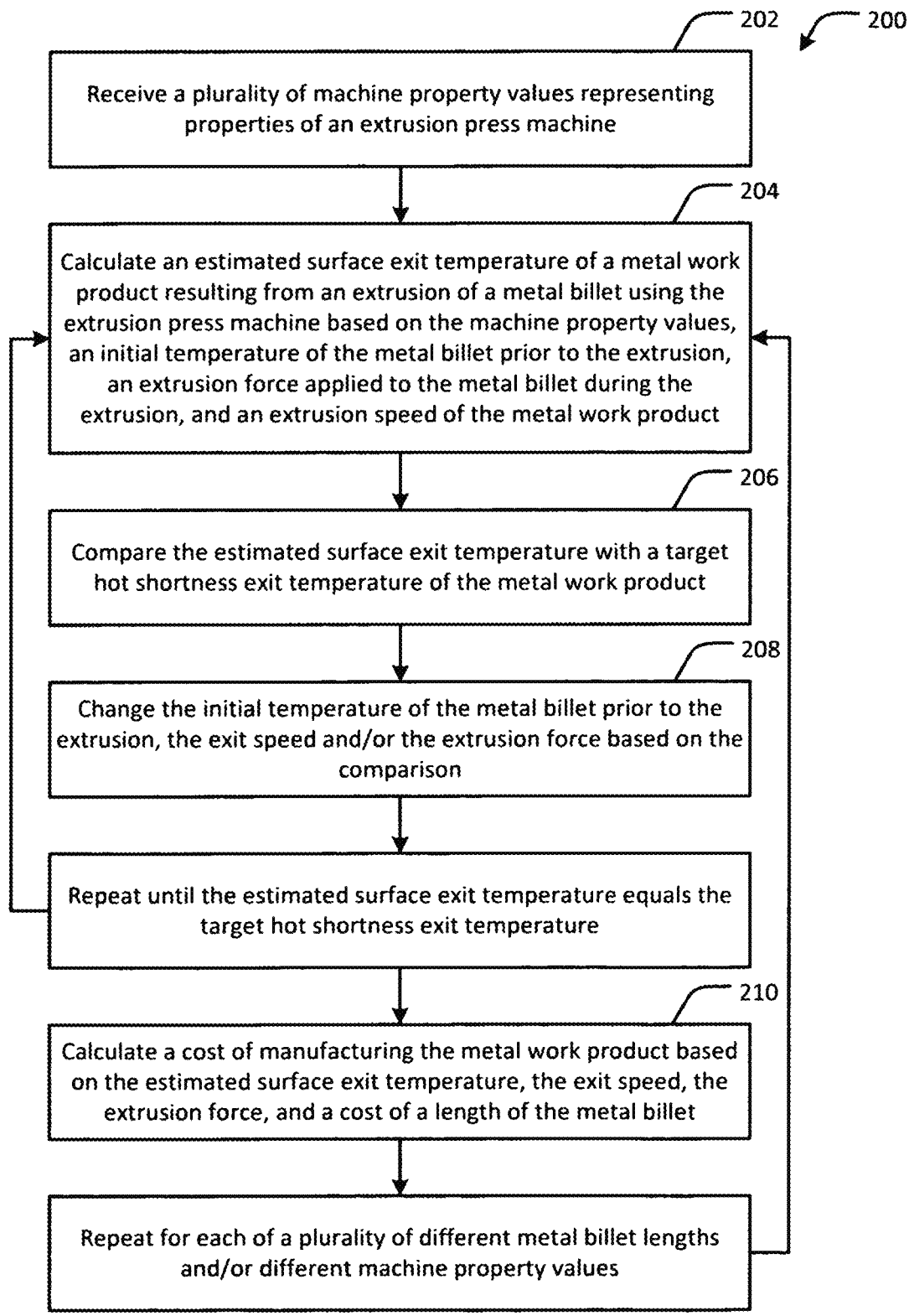
FIG. 2 show a flow diagram of an example methodology for optimizing' metal extrusion process parameters, in accordance with an embodiment of the present disclosure.

FIG. 2 is a flow diagram of an example methodology 200 for optimizing metal extrusion process parameters, in accordance with an embodiment. The method 200 may be implemented, for example, using the example computing system 1000 of FIG. 4. The method 200 begins by receiving 202 a plurality of machine property values representing properties of an extrusion press machine. The machine property values include a maximum ram speed of the extrusion press machine, and the maximum extrusion force capable of being applied by the extrusion press machine to the metal billet during the extrusion. The ram speed cannot exceed the maximum ram speed of the extrusion press machine, and the extrusion force applied to the metal billet during the extrusion cannot exceed the maximum extrusion force of the extrusion press machine.

The method 200 continues by calculating 204 an estimated surface exit temperature of a metal work product resulting from an extrusion of a metal billet using the extrusion press machine. This estimated surface exit temperature may be based on the machine property values, an initial temperature of the metal billet prior to the extrusion, an extrusion force applied to the metal billet during the extrusion, and an extrusion speed of the metal work product. The method 200 continues by comparing 206 the estimated surface exit temperature with a target hot shortness exit temperature of the metal work product. The target hot shortness exit temperature represents a temperature equal to or less than a temperature at which a surface of the metal work product melts.

The method 200 continues by changing 208 at least one of the initial temperature of the metal billet prior to the extrusion, the extrusion speed of the metal work product, and the extrusion force based on the comparison. For example, the initial temperature of the metal billet prior to the extrusion may be increased where the estimated surface exit temperature is less than the target hot shortness exit temperature of the metal work product. In another example, the extrusion speed of the metal work product may be increased where the estimated surface exit temperature is less than the target hot shortness exit temperature of the metal work product. In yet another example, the extrusion force applied to the metal billet during the extrusion may be decreased where the estimated surface exit temperature is greater than the target hot shortness exit temperature of the metal work product. In particular, this corrective action ensures that surface damage to the extruded profile is avoided. Otherwise, continuing extrusion at a maximum ram speed or maximum force may cause such damage.

The method 200 continues by repeating the calculating 204, the comparing 206 and the changing 208 until the estimated surface exit temperature equals the target hot shortness exit temperature.

In some embodiments, the method 200 includes calculating 210 a cost of manufacturing the metal work product based on the estimated surface exit temperature, the extrusion speed of the metal work product, the extrusion force, and a cost of a length of the metal billet. In some embodiments, the method 200 includes repeating the calculating 210 of the cost of manufacturing the metal work product for each of a plurality of different metal billet lengths, for each of a plurality of different machine property values (e.g., for different extrusion press machines), or both.

Figure 3A:
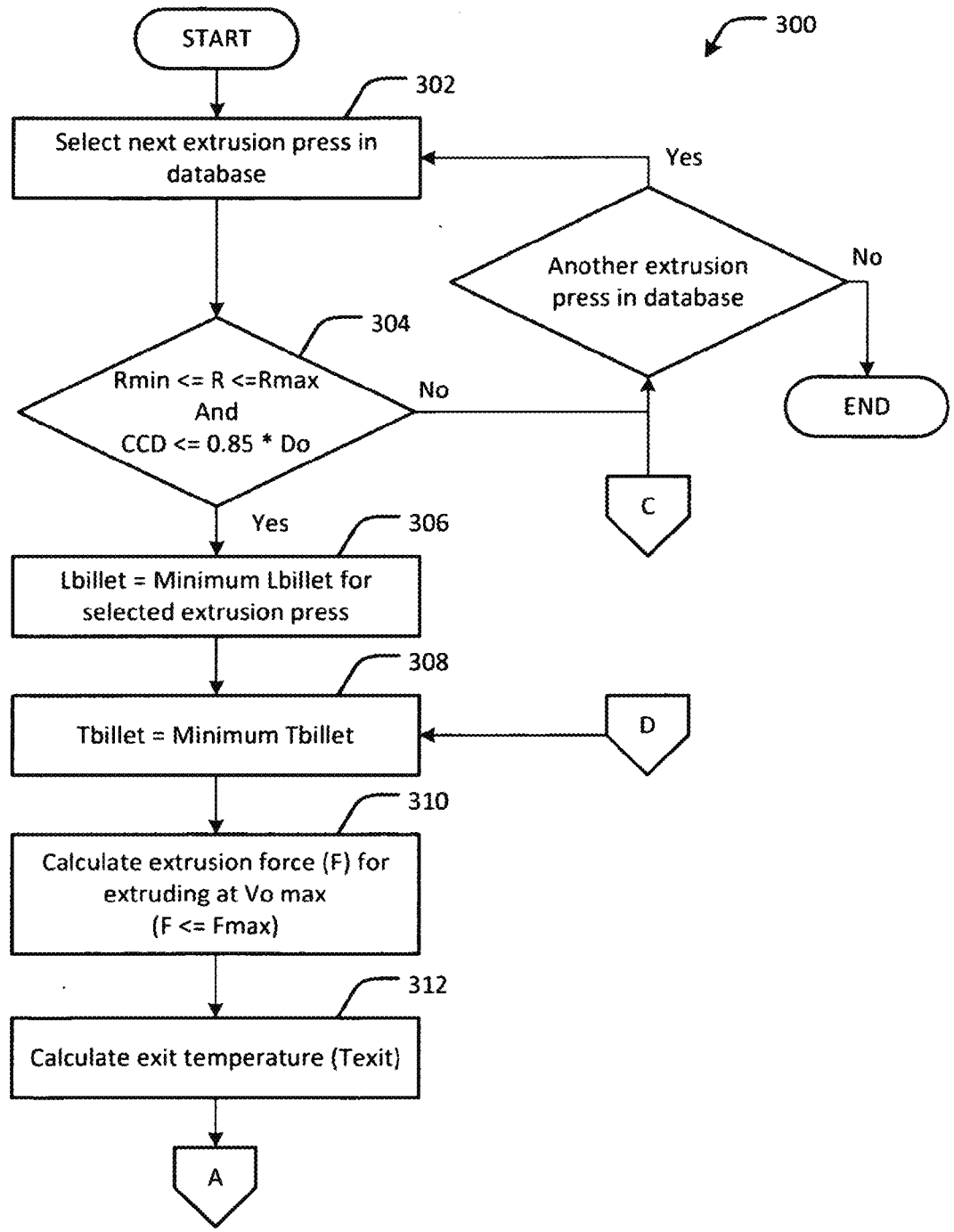
FIGS. 3A, 3B and 3C show a flow diagram of another example methodology 300 for optimizing metal extrusion process parameters, in accordance with an embodiment of the present disclosure.
Figure 3B:
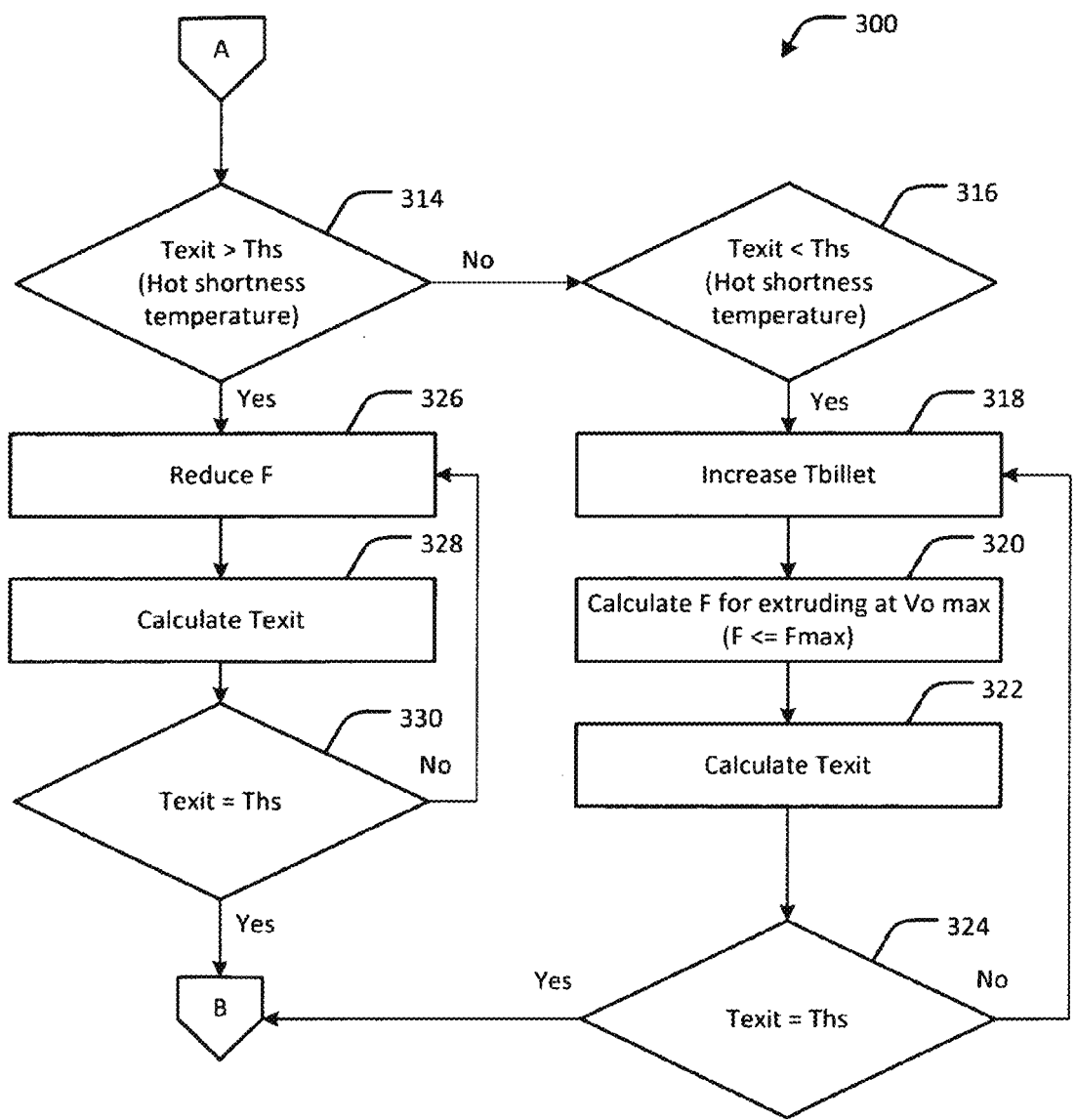
Figure 3C:
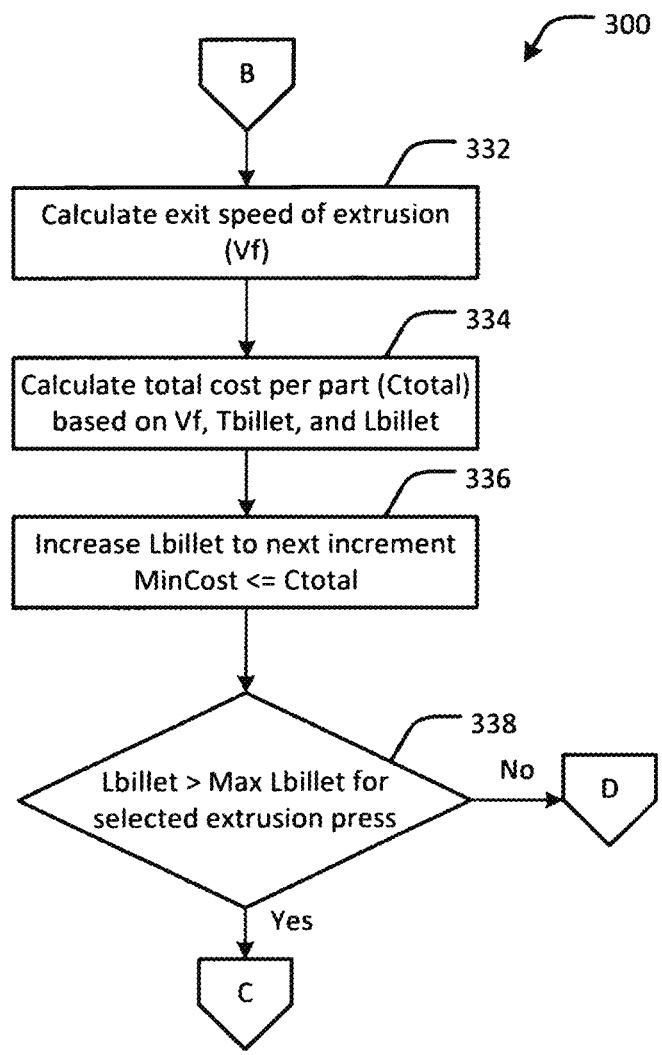

FIGS. 3A, 3B and 3C show a flow diagram of another example methodology 300 for optimizing metal extrusion process parameters, in accordance with an embodiment. The method 300 may be implemented, for example, using the example computing system 1000 of FIG. 4. The method 300 begins by selecting 302 an extrusion press machine from a database. The database may include, for example, the machine property value(s) of one or more different extrusion presses. Next, the extrusion ratio (R) of an extruded profile is calculated 304 assuming that the extrusion will be carried out on the selected extrusion press machine. If the extrusion ratio is between the maximum (Rmax) and minimum (Rmin) permissible extrusion ratios for the extruded alloy, the diameter of the extruded profile's circumscribing circle diameter (CCD) is compared to the billet diameter (Do) of the extrusion press machine. If the circumscribing circle diameter is also less than 85 percent of the billet diameter, extrusion on that extrusion press machine is possible. Otherwise, another extrusion press machine (if any) is selected 302 from the database.

The billet length (Lbillet) is initially set 306 to the minimum value permissible on the selected extrusion press machine, and the temperature of the billet (Tbillet) is set 308 to the minimum billet temperature for the extruded alloy. It is then assumed that extrusion is carried out at the maximum ram speed (Vo) possible on the selected extrusion press machine. The extrusion force (F) required to extrude at that maximum ram speed is calculated or estimated 310, and if the selected extrusion press machine cannot supply the force necessary to extrude the profile at maximum ram speed, the ram speed is reduced so the extrusion press uses all of its available force for extrusion. An example implementation of the calculation 310 of an extrusion force required to maintain a given ram speed at a constant billet temperature is described below with respect to the RamSpeedForceO function. The surface exit temperature (Texit) for the extruded profile is calculated or estimated 312 based on the physics of the extrusion process, and the estimate of the exit temperature is compared 314 against the hot shortness target exit temperature (Ths) of the alloy. An example implementation of the calculation 312 of the estimated exit temperature is described below with respect to the ForceExitTemperatureO function. If the exit temperature on the surface of the extruded profile is lower 316 than the hot shortness target exit temperature, the billet temperature is increased 318 to reduce the extruded alloy's flow stress and increase 320 the exit speed of the extruded profile while still ensuring the maximum press ram speed is not exceeded. The surface exit temperature for the extruded profile is calculated 322 and the billet temperature is increased 318 until the exit temperature on the surface of the extruded profile is equal 324 to the hot shortness target exit temperature. If, on the other hand, the surface exit temperature for the extruded profile is higher 314 than the target temperature for hot shortness, the extrusion force is decreased 326 to slow down the extrusion process until the surface exit temperature 328 for the extruded profile is equal 330 to the hot shortness target exit temperature.

Next, the optimal billet temperature, the optimal extrusion press force and the optimal exit speed (Vf) of the extruded profile are calculated 332 for the smallest billet length possible on the extrusion press. An example implementation of the calculation 332 of exit speed (Vf) is described below with respect to the ForceExitSpeed( ) function. Based on these optimal process parameters, the minimum total cost per part (Ctotal) is calculated 334 at that minimum billet length. The billet length is then increased 336 by a small amount and the entire process repeated 338 until the billet length reaches a maximum to estimate the optimal billet temperature, the optimal extrusion press force, and the optimal exit speed of the extruded profile at the new billet length. The total cost per part (Ctotal) is calculated based on these optimal process parameters to yield the minimum total cost per part at that billet length. The billet length is changed to values between the minimum and maximum billet length limits for the selected extrusion press machine and the optimization process repeated to determine the optimal process parameters for each billet length. The minimum total cost per part is calculated for each billet length based on these optimal process parameters and then plotted out as a function of billet length. The optimal billet length is then identified as the billet length that results in the lowest minimum total cost per part with the optimal process parameters being the billet temperature, press force, and exit speed that correspond to that optimal billet length.

This optimization process is then repeated for each extrusion press available in the database of extrusion presses. The extrusion press that results in the overall lowest total cost per part is identified as the optimal extrusion press to extrude the part, and the optimal process parameters to yield the lowest minimum total cost for the part are those that correspond to the optimal billet length on that extrusion press.

In at least one embodiment, the method 300 includes measuring (e.g., by the computing system 1000 of FIG. 4) at least one of the plurality of machine property values from the extrusion press machine. In at least one embodiment, the method 300 includes commanding (e.g., by the computing system 1000) the extrusion press machine to apply the extrusion force to the metal billet while operating the extrusion press machine at the extrusion speed.

In some embodiments, the method 300 includes commanding, by a computer processor, the extrusion press machine to apply the extrusion force to the metal billet while operating the extrusion press machine at the extrusion speed (e.g., to obtain the optimal extrusion press speed for the selected extrusion press). In some embodiments, the method 300 includes commanding, by the computer processor, a billet heating furnace to vary the temperature of the billet (e.g., to obtain the optimal billet temperature for the selected extrusion press). In some embodiments, the method includes commanding, by the computer processor, a billet cutting/shearing device to vary the length of the billet (e.g., to obtain the optimal billet length for the selected extrusion press).

Example Pseudo-Code

The pseudo-code Function Main( ) provided in the computer program listing appendix and at the end of the detailed description represents an example implementation of at least a portion of the method 300, in accordance with an embodiment.

The pseudo-code Function RamSpeedForceO provided in the computer program listing appendix represents an example implementation of at least a portion of the method 300, in accordance with an embodiment. This particular example includes a routine for determining the extrusion force required to maintain a given ram speed at a constant billet temperature.

The pseudo-code Function ForceExitTemperature( ) provided in the computer program listing appendix represents an example implementation of at least a portion of the method 300, in accordance with an embodiment. This particular example includes a routine for determining the extrusion exit temperature that results from applying a force to the billet at a constant billet temperature.

The pseudo-code Function ForceExitSpeed( ) provided in the computer program listing appendix represents an example implementation of at least a portion of the method 300, in accordance with an embodiment. This particular example includes a routine for determining the extrusion exit speed generated by a press force at a constant billet temperature.

The pseudo-code Function StrainRateSensitivityExponent( ) provided in the computer program listing appendix represents an example implementation of at least a portion of the method 300, in accordance with an embodiment. This particular example includes a routine for determining the instantaneous value of the material strength coefficient at Temperature for the selected material.

The pseudo-code Function StrengthCoefficient( ) provided in the computer program listing appendix represents an example implementation of at least a portion of the method 300, in accordance with an embodiment. This particular example includes a routine for determining the instantaneous value of the material strength coefficient at Temperature for the selected material.

The pseudo-code Function SpecificHeat( ) provided in the computer program listing appendix represents an example implementation of at least a portion of the method 300, in accordance with an embodiment. This particular example includes a routine for determining the instantaneous value of specific heat at Temperature for the selected material.

The pseudo-code Function ThermalConductivity( ) provided in the computer program listing appendix represents an example implementation of at least a portion of the method 300, in accordance with an embodiment. This particular example includes a routine for determining the instantaneous value of thermal conductivity at Temperature for the selected material.

The pseudo-code Function AverageStrainRateSensitivityExponent( ) provided in the computer program listing appendix represents an example implementation of at least a portion of the method 300, in accordance with an embodiment. This particular example includes a routine for determining the average value of the material strain rate sensitivity exponent over the temperature range between Temperature1 and Temperature2 for the selected material.

The pseudo-code Function AverageStrengthCoefficient( ) provided in the computer program listing appendix represents an example implementation of at least a portion of the method 300, in accordance with an embodiment. This particular example includes a routine for determining the average value of the material strength coefficient over the temperature range between Temperature1 and Temperature2 for the selected material.

The pseudo-code Function AverageSpecificHeat( ) provided in the computer program listing appendix represents an example implementation of at least a portion of the method 300, in accordance with an embodiment. This particular example includes a routine for determining the average value of specific heat over the temperature range between Temperature1 and Temperature2 for the selected material.

The pseudo-code Function AverageThermalDiffusivity( ) provided in the computer program listing appendix represents an example implementation of at least a portion of the method 300, in accordance with an embodiment. This particular example includes a routine for determining the average value of thermal diffusivity over the temperature range between Temperature1 and Temperature2 for the selected material.

The pseudo-code Function AverageThermalConductivity( ) provided in the computer program listing appendix represents an example implementation of at least a portion of the method 300, in accordance with an embodiment. This particular example includes a routine for determining the average value of thermal conductivity over the temperature range between Temperature1 and Temperature2 for the selected material.

The pseudo-code Function KShapeAdjustedFactor( ) provided in the computer program listing appendix represents an example implementation of at least a portion of the method 300, in accordance with an embodiment. This particular example includes a routine for determining adjusted value of the K shape factor for the extruded profile with ExternalPerimeter( ) and CrossSectionalArea( ).

The pseudo-code Function ExtrusionRatio( ) provided in the computer program listing appendix represents an example implementation of at least a portion of the method 300, in accordance with an embodiment. This particular example includes a routine for determining the extrusion ratio for the extruded profile with CrossSectionalArea( ) extruded on ExtrusionPressNumber.

The pseudo-code Function DeltaT1( ) provided in the computer program listing appendix represents an example implementation of at least a portion of the method 300, in accordance with an embodiment. This particular example includes a routine for determining the temperature rise due to work done to deform extruded material.

The pseudo-code Function DeltaT2( ) provided in the computer program listing appendix represents an example implementation of at least a portion of the method 300, in accordance with an embodiment. This particular example includes a routine for determining the increase in surface temperature on the billet due to billet/container friction.

The pseudo-code Function DeltaT3( ) provided in the computer program listing appendix represents an example implementation of at least a portion of the method 300, in accordance with an embodiment. This particular example includes a routine for determining the increase in surface temperature on the extruded profile due to friction between die land and the extruded profile.

The pseudo-code Function DieLandLength( ) provided in the computer program listing appendix represents an example implementation of at least a portion of the method 300, in accordance with an embodiment. This particular example includes a routine for determining the length of the extrusion die land.

The pseudo-code Function ExtrusionPressProcessCostPerPart( ) provided in the computer program listing appendix represents an example implementation of at least a portion of the method 300, in accordance with an embodiment. This particular example includes a routine for determining the process cost per part to extrude the part on ExtrusionPressNumber with a billet length equal to BilletLength and an exit speed equal to ExitSpeed.

The pseudo-code Function ExtrusionPressCycleTimePerPart( ) provided in the computer program listing appendix represents an example implementation of at least a portion of the method 300, in accordance with an embodiment. This particular example includes a routine for determining the time in seconds to extrude a single part, including the extrusion of all extruded material that does not end up in the final extruded part.

The pseudo-code Function LengthExtruded( ) provided in the computer program listing appendix represents an example implementation of at least a portion of the method 300, in accordance with an embodiment. This particular example includes a routine for determining the length of material extruded to make the batch of parts.

The pseudo-code Function VolumeExtruded( ) provided in the computer program listing appendix represents an example implementation of at least a portion of the method 300, in accordance with an embodiment. This particular example includes a routine for determining the volume of material extruded to make the batch of parts.

The pseudo-code Function NumberOfExtrusionsRequired( ) provided in the computer program listing appendix represents an example implementation of at least a portion of the method 300, in accordance with an embodiment. This particular example includes a routine for determining the number of extrusions that must be made to produce the batch of parts.

The pseudo-code Function NumberPartsThatFitOnRunoutTable( ) provided in the computer program listing appendix represents an example implementation of at least a portion of the method 300, in accordance with an embodiment. This particular example includes a routine for determining the number of usable parts that can be produced from an extrusion that will fit on the runout table associated with ExtrusionPressNumber.

The pseudo-code Function NumberOfBilletsExtrudedForBatch( ) provided in the computer program listing appendix represents an example implementation of at least a portion of the method 300, in accordance with an embodiment. This particular example includes a routine for determining the number of billets that must be extruded to produce the batch of parts.

The pseudo-code Function VolumeExtrudablePerBillet( ) provided in the computer program listing appendix represents an example implementation of at least a portion of the method 300, in accordance with an embodiment. This particular example includes a routine for determining the volume of material that can be extruded from one billet with a length equal to BilletLength.

The pseudo-code Function MaterialCostPerPart( ) provided in the computer program listing appendix represents an example implementation of at least a portion of the method 300, in accordance with an embodiment. This particular example includes a routine for determining the cost of material used per part when extruding on ExtrusionPressNumber and BilletLength. This includes the recovery of scrap material generated.

The pseudo-code Function CostOfMaterialPurchasedPerBatch( ) provided in the computer program listing appendix represents an example implementation of at least a portion of the method 300, in accordance with an embodiment. This particular example includes a routine for determining the cost of material purchased per batch.

The pseudo-code Function Material WeightUsedPerBatch( ) provided in the computer program listing appendix represents an example implementation of at least a portion of the method 300, in accordance with an embodiment. This particular example includes a routine for determining the weight of material used to produce the batch of parts, in kilograms (Kg).

The pseudo-code Function VolmeOfMaterialNotExtrudedInBatch( ) provided in the computer program listing appendix represents an example implementation of at least a portion of the method 300, in accordance with an embodiment. This particular example includes a routine for determining the volume of material contained in the dead zone of all billets extruded to produce the batch of parts.

The pseudo-code Function ValueOfScrapMaterialPerBatch( ) provided in the computer program listing appendix represents an example implementation of at least a portion of the method 300, in accordance with an embodiment. This particular example includes a routine for determining the scrap value recovered for all scrap material generated when producing batch of parts. This includes material crushed when stretching extruded profile with puller, material lost in the kerf of all sawing operations, and the material contained in all billet dead zones.

The pseudo-code Function VolumeOfScrapMaterialPerBatch( ) provided in the computer program listing appendix represents an example implementation of at least a portion of the method 300, in accordance with an embodiment. This particular example includes a routine for determining the volume of scrap material generated when producing batch of parts. This includes material crushed when stretching extruded profile with puller, material lost in the kerf of all sawing operations, and the material contained in all billet dead zones.

The pseudo-code Function CostPerPartForBilletHeating( ) provided in the computer program listing appendix represents an example implementation of at least a portion of the method 300, in accordance with an embodiment. This particular example includes a routine for determining the cost per part for heating the billet from its storage temperature to the BilletTemperature.

The pseudo-code Function EnergyRequiredToHeatMaterialForBatch( ) provided in the computer program listing appendix represents an example implementation of at least a portion of the method 300, in accordance with an embodiment. This particular example includes a routine for determining the energy, in Joules, required to heat material required to make batch of parts from the billet storage temperature to BilletTemperature.

The pseudo-code Function ExtrusionSetupCostPerPart( ) provided in the computer program listing appendix represents an example implementation of at least a portion of the method 300, in accordance with an embodiment. This particular example includes a routine for determining the cost per part required to setup the extrusion press and associated equipment to produce the batch of parts.

Example System

Figure 4:
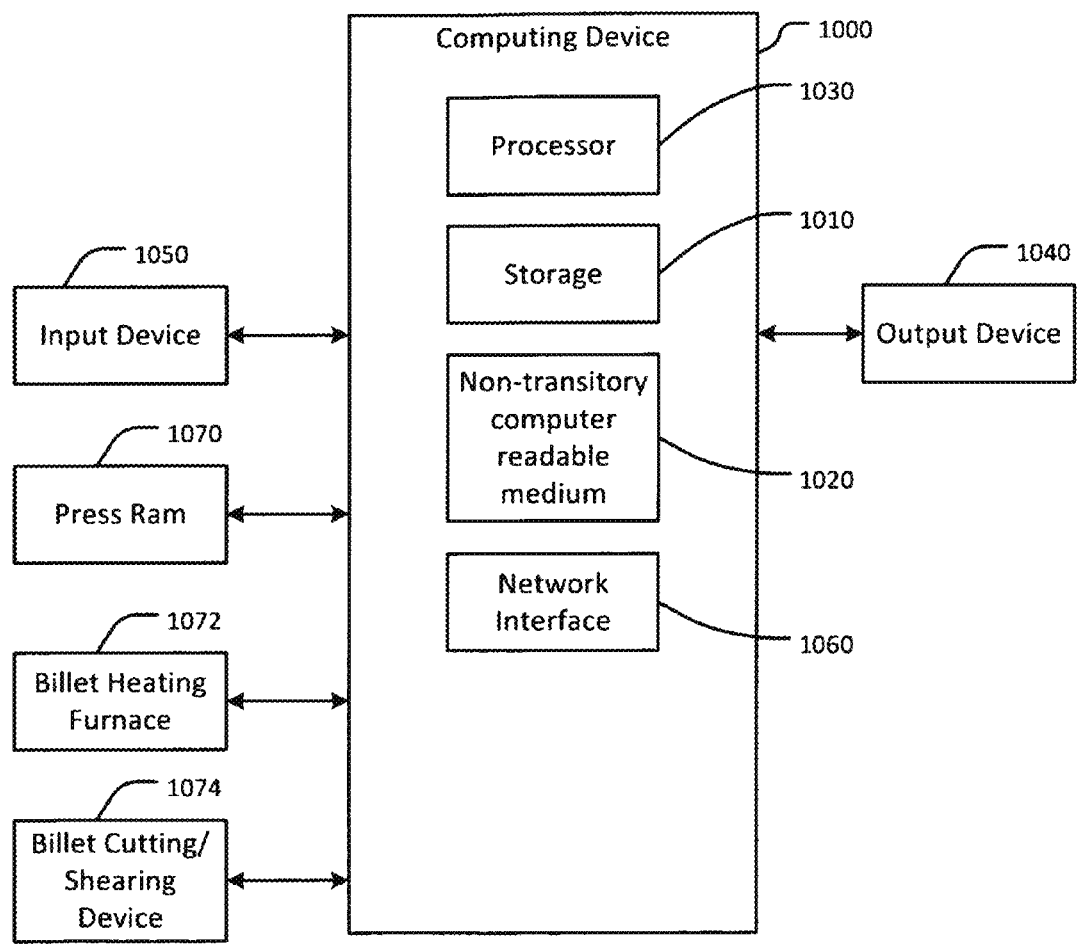
FIG. 4 shows a computing and press ram system that can be implemented in accordance with various embodiments of the present disclosure.

FIG. 4 is a block diagram representing an example computing device 1000 that may be used to perform any of the techniques as variously described in this disclosure. For example, the system 100 may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one or more processors.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a network interface 1060. The computing device 1000 can include and/or be operatively coupled to various suitable devices, such as an extrusion press machine 1070, a billet heating furnace 1072, and/or a billet cutting/shearing device 1074, configured to perform one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system disclosed herein can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving a plurality of machine property values representing properties of an extrusion press machine; calculating an estimated surface exit temperature of a metal work product resulting from an extrusion of a metal billet using the extrusion press machine based on the machine property values, an initial temperature of the metal billet prior to the extrusion, an extrusion force applied to the metal billet during the extrusion, and an extrusion speed of the metal work product; comparing the estimated surface exit temperature with a target hot shortness exit temperature of the metal work product, the target hot shortness exit temperature representing a temperature equal to or less than a temperature at which a surface of the metal work product melts; changing at least one of the initial temperature of the metal billet prior to the extrusion, the extrusion speed of the metal work product, and the extrusion force based on the comparison; and repeating the calculating, the comparing and the changing until the estimated surface exit temperature equals the target hot shortness exit temperature. In some cases, the changing includes at least one of: increasing the initial temperature of the metal billet prior to the extrusion, where the estimated surface exit temperature is less than the target hot shortness exit temperature of the metal work product; increasing the extrusion speed of the metal work product, where the estimated surface exit temperature is less than the target hot shortness exit temperature of the metal work product; and decreasing the extrusion force applied to the metal billet during the extrusion, where the estimated surface exit temperature is greater than the target hot shortness exit temperature of the metal work product. In some cases, the process includes calculating a cost of manufacturing the metal work product based on the estimated surface exit temperature, the extrusion speed of the metal work product, the extrusion force, and a cost of a length of the metal billet. In some such cases, the process further includes repeating the calculating of the cost of manufacturing the metal work product for each of a plurality of different metal billet lengths. In some other such cases, the process includes repeating the calculating of the cost of manufacturing the metal work product for each of a plurality of different machine property values. In some cases, the machine property values include a maximum speed of a press ram of the extrusion press machine and/or a maximum extrusion force that can be applied to the metal billet by the extrusion press machine during the extrusion, where the speed of the press ram cannot exceed the maximum speed of the press ram, and where the extrusion force that can be applied to the metal billet during the extrusion cannot exceed the maximum extrusion force that can be applied to the metal billet during the extrusion. In some cases, the system includes the extrusion press machine operatively coupled to the processor, and the process includes measuring at least one of the machine property values from the extrusion press machine. In some cases, the process includes: commanding the extrusion press machine to apply the extrusion force to the metal billet while operating the extrusion press machine at the extrusion speed; commanding, by the computer processor, a billet heating furnace to vary the initial temperature of the metal billet; and/or commanding, by the computer processor, a billet cutting/shearing device to vary a length of the metal billet. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

Computer Program Listing

```
For ExtrusionPressNumber = 1 to
NumberOfExtrusionPressesInDatabase ( )
   If ExtrusionRatio(ExtrusionPressNumber) <=
   MaximumExtrusionRatio(MaterialNumber) And
   ExtrusionRatio(ExtrusionPressNumber) >=
   MinimumExtrusionRatio(MaterialNumber) And
   CircumscribingCircleDiameter( ) <= (0.85 *
   BilletDiameter(ExtrusionPressNumber)) Then ` Extrusion on the press is
   possible
      BilletLength = MinBilletLength(ExtrusionPressNumber)
      While BilletLength <= MaxBilletLength(ExtrusionPressNumber)
         TempBilletTemperature =
         MinimumBilletTemperature(MaterialNumber)
         PressForceDetermined = False
         ` Assume that extrusion occurs at maximum ram speed of press
         TempExtrusionForce = RamSpeedForce(ExtrusionPressNumber,
         BilletLength, TempBilletTemperature,
         MaxRamSpeed(ExtrusionPressNumber))
         If TempExtrusionForce >
         MaxPressForce(ExtrusionPressNumber) Then
         ` Press cannot supply enough force to extrude at maximum
         ram speed. Extrusion will occur at maximum press force
         instead
            TempExtrusionForce = MaxPressForce(ExtrusionPressNumber)
         End If
         TemperatureErrorBand = 0.1
         `Calculate the exit temperature that results from applying
         TempExtrusionForce to the billet
         TempHotShortnessExitTemperature =
         ForceExitTemperature(ExtrusionPressNumber, BilletLength,
         TempBilletTemperature, TempExtrusionForce)
         ` Compare the resulting exit temperature to the hot shortness
         limit temperature for material and adjust billet temperature or
         press force accordingly
         If TempHotShortnessExitTemperature >
         HotShortnessTemperature(MaterialNumber) Then
         ` Assumption that extrusion will occur at maximum press ram
         speed or maximum press force was incorrect.
            ForceLowerValue =0
            ForceUpperValue = TempExtrusionForce
            TempExtrusionForce = (ForceUpperValue +
            ForceLowerValue)/2
            TempBilletTemperature =
            MinimumBilletTemperature(MaterialNumber)
            While Not PressForceDetermined ` Press force reduction loop
               TempHotShortnessExitTemperature =
               ForceExitTemperature(ExtrusionPressNumber,
               BilletLength, TempBilletTemperature,
               TempExtrusionForce)
               If TempHotShortnessExitTemperature >
               HotShortnessTemperature(MaterialNumber) +
               TemperatureErrorBand Then
                  ForceUpperValue = TempExtrusionForce
                  TempExtrusionForce = (ForceUpperValue +
                  ForceLowerValue)/2
               ElseIf TempHotShortnessExitTemperature <
               HotShortnessTemperature(MaterialNumber) −
               TemperatureErrorBand Then
                  ForceLowerValue = TempExtrusionForce
                  TempExtrusionForce = (ForceUpperValue +
                  ForceLowerValue)/2
               ElseIf TempHotShortnessExitTemperature <=
               HotShortnessTemperature(MaterialNumber) +
               TemperatureErrorBand And
               TempHotShortnessExitTemperature >=
               HotShortnessTemperature(MaterialNumber) −
               TemperatureErrorBand Then
                  PressForceDetermined = True
               End If
            Wend ` Press force reduction loop
         ElseIf TempHotShortnessExitTemperature <
         HotShortnessTemperature(MaterialNumber) Then
            BilletTemperatureUpperValue =
            HotShortnessTemperature(MaterialNumber)
            BilletTemperatureLowerValue = TempBilletTemperature
            TempBilletTemperature = (BilletTemperatureUpperValue +
            BilletTemperatureLowerValue)/2
            While Not PressForceDetermined ` Billet temperature
            increasing loop
               TempExtrusionForce =
               RamSpeedForce(ExtrusionPressNumber, BilletLength,
               TempBilletTemperature,
               MaxRamSpeed(ExtrusionPressNumber))
               If TempExtrusionForce >
               MaxPressForce(ExtrusionPressNumber) Then
               ` Press cannot supply enough force to extrude
               at maximum ram speed. Extrusion will occur at
               maximum press force instead
                  TempExtrusionForce =
                  MaxPressForce(ExtrusionPressNumber)
               End If
               TempHotShortnessExitTemperature =
               ForceExitTemperature(ExtrusionPressNumber,
               BilletLength, TempBilletTemperature,
               TempExtrusionForce)
               If TempHotShortnessExitTemperature <
               HotShortnessTemperature(MaterialNumber) −
               TemperatureErrorBand Then
                  BilletTemperatureLowerValue =
                  TempBilletTemperature
                  TempBilletTemperature =
                  (BilletTemperatureUpperValue +
                  BilletTemperatureLowerValue)/2
               ElseIf TempHotShortnessExitTemperature >
               HotShortnessTemperature(MaterialNumber) +
               TemperatureErrorBand Then
                  BilletTemperatureUpperValue =
                  TempBilletTemperature
                  TempBilletTemperature =
                  (BilletTemperatureUpperValue +
                  BilletTemperatureLowerValue)/2
               ElseIf TempHotShortnessExitTemperature >
               HotShortnessTemperature(MaterialNumber) −
               TemperatureErrorBand And
               TempHotShortnessExitTemperature <
               HotShortnessTemperature(MaterialNumber) +
               TemperatureErrorBand Then
                  PressForceDetermined = True
               End If
            Wend ` Billet temperature increasing loop
         End If
         ExitSpeed = ForceExitSpeed(ExtrusionPressNumber, BilletLength,
         TempBilletTemperature, TempExtrusionForce)
         ExitTemperature = TempHotShortnessExitTemperature
         ExtrusionForce =TempExtrusionForce
         BilletTemperature – TempBilletTemperature
         TotalCostPerPart =
         ExtrusionPressProcessCostPerPart(ExtrusionPressNumber,
         BilletLength, ExitSpeed) +
         MaterialCostPerPart(ExtrusionPressNumber, BilletLength) +
         CostPerPartForBilletHeating(ExtrusionPressNumber, BilletLength,
         BilletTemperature) +
```

```
ExtrusionSetupCostPerPart(ExtrusionPressNumber)
If BilletLength = MinBilletLength(ExtrusionPressNumber) then
First pass through loop
    MinCost = TotalCostPerPart
    OptimalBilletLength =BilletLength
    OptimalExitSpeed - ExitSpeed
    OptimalExitTemperature = ExitTemperature
    OptimalExtrusionForce = ExtrusionForce
    OptimalBilletTemperature - BilletTemperature
Else` Not the first pass through loop
If MinCost >= TotalCostPerPart Then
    MinCost = TotalCostPerPart
    OptimalBilletLength = BilletLength
    OptimalExitSpeed = ExitSpeed
    OptimalExitTemperature = ExitTemperature
    OptimalExtrusionForce = ExtrusionForce
    OptimalBilletTemperature = BilletTemperature
End if
End If
BilletLength = BilletLength + BilletLengthIncrement( )
Wend ` Billet length increasing loop
End If
NEXT ExtrusionPressNumber
```

What is claimed is:

1. A system comprising:
a storage; and
a processor operatively coupled to the storage, the processor configured to execute instructions stored in the storage that when executed cause the processor to carry out a process comprising:
receiving a plurality of machine property values representing properties of an extrusion press machine;
calculating an estimated surface exit temperature of a metal work product resulting from an extrusion of a metal billet using the extrusion press machine based on the machine property values, an initial temperature of the metal billet prior to the extrusion, an extrusion force applied to the metal billet during the extrusion, and an initial extrusion speed of the metal work product, wherein the initial temperature of the metal billet prior to the extrusion is a minimum recrystallization temperature of the metal work product;
comparing the estimated surface exit temperature with a target hot shortness exit temperature of the metal work product, the target hot shortness exit temperature representing a temperature equal to or less than a temperature at which a surface of the metal work product melts;
repeatedly and automatically increasing the initial temperature of the metal billet prior to the extrusion by a fixed increment, calculating an extrusion speed of the metal work product that occurs at a maximum extrusion force of the extrusion press machine at the increased initial temperature of the metal billet, and recalculating the estimated surface exit temperature using the increased initial temperature of the metal billet and the calculated extrusion speed
until the estimated surface exit temperature equals the target hot shortness exit temperature; and at least one of
commanding the extrusion press machine to apply the extrusion force to the metal billet while operating the extrusion press machine at the calculated extrusion speed of the metal work product that occurs at the maximum extrusion force of the extrusion press machine at the increased initial temperature of the metal billet,
commanding a billet heating furnace to vary the initial temperature of the metal billet, and
commanding a billet cutting/shearing device to vary a length of the metal billet.

2. The system of claim 1, wherein the process further comprises at least one of:
increasing the initial temperature of the metal billet prior to the extrusion, where the estimated surface exit temperature is less than the target hot shortness exit temperature of the metal work product;
increasing the extrusion speed of the metal work product, where the estimated surface exit temperature is less than the target hot shortness exit temperature of the metal work product; and
decreasing the extrusion force applied to the metal billet during the extrusion, where the estimated surface exit temperature is greater than the target hot shortness exit temperature of the metal work product.

3. The system of claim 1, wherein the process further comprises calculating a cost of manufacturing the metal work product based on the estimated surface exit temperature, the extrusion speed of the metal work product, the extrusion force, and a cost of a length of the metal billet.

4. The system of claim 3, wherein the process further comprises repeating the calculating of the cost of manufacturing the metal work product for each of a plurality of different metal billet lengths.

5. The system of claim 3, wherein the process further comprises repeating the calculating of the cost of manufacturing the metal work product for each of a plurality of different machine property values.

6. The system of claim 1, wherein the machine property values include at least one of a maximum speed of a press ram of the extrusion press machine and a maximum extrusion force that can be applied to the metal billet by the extrusion press machine during the extrusion, wherein the speed of the press ram cannot exceed the maximum speed of the press ram, and wherein the extrusion force that can be applied to the metal billet during the extrusion cannot exceed the maximum extrusion force that can be applied to the metal billet during the extrusion.

7. The system of claim 1, further comprising the extrusion press machine operatively coupled to the processor, wherein the process further comprises measuring at least one of the plurality of machine property values from the extrusion press machine.

8. A computer-implemented method comprising:
receiving, by a computer processor, a plurality of machine property values representing properties of an extrusion press machine;
calculating, by the computer processor, an estimated surface exit temperature of a metal work product resulting from an extrusion of a metal billet using the extrusion press machine based on the machine property values, an initial temperature of the metal billet prior to the extrusion, an extrusion force applied to the metal billet during the extrusion, and an initial extrusion speed of the metal work product, wherein the initial temperature of the metal billet prior to the extrusion is a minimum recrystallization temperature of the metal work product;
comparing, by the computer processor, the estimated surface exit temperature with a target hot shortness exit temperature of the metal work product, the target hot shortness exit temperature representing a temperature equal to or less than a temperature at which a surface of the metal work product melts;

repeatedly and automatically, by the computer processor, increasing the initial temperature of the metal billet prior to the extrusion by a fixed increment, calculating an extrusion speed of the metal work product that occurs at a maximum extrusion force of the extrusion press machine at the increased initial temperature of the metal billet, and recalculating the estimated surface exit temperature using the increased initial temperature of the metal billet and the calculated extrusion speed until the estimated surface exit temperature equals the target hot shortness exit temperature; and at least one of commanding the extrusion press machine to apply the extrusion force to the metal billet while operating the extrusion press machine at the calculated extrusion speed of the metal work product that occurs at the maximum extrusion force of the extrusion press machine at the increased initial temperature of the metal billet, commanding a billet heating furnace to vary the initial temperature of the metal billet, and commanding a billet cutting/shearing device to vary a length of the metal billet.

9. The method of claim 8, further comprising at least one of:

increasing the initial temperature of the metal billet prior to the extrusion, where the estimated surface exit temperature is less than the target hot shortness exit temperature of the metal work product;

increasing the extrusion speed of the metal work product, where the estimated surface exit temperature is less than the target hot shortness exit temperature of the metal work product; and decreasing the extrusion force applied to the metal billet during the extrusion, where the estimated surface exit temperature is greater than the target hot shortness exit temperature of the metal work product.

10. The method of claim 8, further comprising calculating, by the computer processor, a cost of manufacturing the metal work product based on the estimated surface exit temperature, the extrusion speed of the metal work product, the extrusion force, and a cost of a length of the metal billet.

11. The method of claim 10, further comprising repeating the calculating of the cost of manufacturing the metal work product for each of a plurality of different metal billet lengths.

12. The method of claim 10, further comprising repeating the calculating of the cost of manufacturing the metal work product for each of a plurality of different machine property values.

13. The method of claim 8, wherein the machine property values include at least one of a maximum speed of a press ram of the extrusion press machine and a maximum extrusion force that can be applied to the metal billet by the extrusion press machine during the extrusion.

14. The method of claim 13, wherein the speed of the press ram cannot exceed the maximum speed of the press ram, and wherein the extrusion force applied to the metal billet during the extrusion cannot exceed the maximum extrusion force that can be applied to the metal billet.

15. The method of claim 8, further comprising measuring, by the computer processor, at least one of the plurality of machine property values from the extrusion press machine.

16. A non-transitory computer program product having instructions encoded thereon that when executed by one or more processors cause a process to be carried out, the process comprising:

receiving a plurality of machine property values representing properties of an extrusion press machine;

calculating an estimated surface exit temperature of a metal work product resulting from an extrusion of a metal billet using the extrusion press machine based on the machine property values, an initial temperature of the metal billet prior to the extrusion, an extrusion force applied to the metal billet during the extrusion, and an initial extrusion speed of the metal work product, wherein the initial temperature of the metal billet prior to the extrusion is a minimum recrystallization temperature of the metal work product;

comparing the estimated surface exit temperature with a target hot shortness exit temperature of the metal work product, the target hot shortness exit temperature representing a temperature equal to or less than a temperature at which a surface of the metal work product melts;

repeatedly and automatically increasing the initial temperature of the metal billet prior to the extrusion by a fixed increment, calculating an extrusion speed of the metal work product that occurs at a maximum extrusion force of the extrusion press machine at the increased initial temperature of the metal billet, and recalculating the estimated surface exit temperature using the increased initial temperature of the metal billet and the calculated extrusion speed until the estimated surface exit temperature equals the target hot shortness exit temperature; and at least one of commanding the extrusion press machine to apply the extrusion force to the metal billet while operating the extrusion press machine at the calculated extrusion speed of the metal work product that occurs at the maximum extrusion force of the extrusion press machine at the increased initial temperature of the metal billet, commanding a billet heating furnace to vary the initial temperature of the metal billet, and commanding a billet cutting/shearing device to vary a length of the metal billet.

17. The non-transitory computer program product of claim 16, wherein the process further comprises at least one of:

increasing the initial temperature of the metal billet prior to the extrusion, where the estimated surface exit temperature is less than the target hot shortness exit temperature of the metal work product;

increasing the extrusion speed of the metal work product, where the estimated surface exit temperature is less than the target hot shortness exit temperature of the metal work product; and decreasing the extrusion force applied to the metal billet during the extrusion, where the estimated surface exit temperature is greater than the target hot shortness exit temperature of the metal work product.

18. The computer program product of claim 16, wherein the process further comprises calculating a cost of manufacturing the metal work product based on the estimated surface exit temperature, the extrusion speed of the metal work product, the extrusion force, and a cost of a length of the metal billet.

19. The computer program product of claim 18, wherein the process further comprises repeating the calculating of the cost of manufacturing the metal work product for each of a plurality of different metal billet lengths.

20. The computer program product of claim 18, wherein the process further comprises repeating the calculating of the cost of manufacturing the metal work product for each of a plurality of different machine property values.

21. The computer program product of claim 16, further comprising measuring at least one of the plurality of machine property values from the extrusion press machine.

* * * * *